United States Patent [19]

Yuan

[11] 4,184,477

[45] Jan. 22, 1980

[54] SOLAR HEATING AND STORAGE

[76] Inventor: Shao W. Yuan, 6701 Montour Dr., Falls Church, Va. 22043

[21] Appl. No.: 793,367

[22] Filed: May 3, 1977

[51] Int. Cl.² .............................................. F24J 3/02
[52] U.S. Cl. .................................... 126/433; 126/435; 126/436; 126/437; 165/105
[58] Field of Search ....................... 126/400, 270, 271; 237/1 A, 59, 63; 165/105; 60/641; 62/333

[56] References Cited

U.S. PATENT DOCUMENTS

| | | | |
|---|---|---|---|
| 3,262,493 | 7/1966 | Hervey | 126/271 |
| 3,774,677 | 11/1973 | Antonetti et al. | 165/105 |
| 3,960,136 | 6/1976 | Moan et al. | 126/271 |
| 4,000,851 | 1/1977 | Heilemann | 126/400 |
| 4,057,963 | 11/1977 | Basiulis | 126/271 |
| 4,061,131 | 12/1977 | Bohanon | 126/271 |
| 4,067,315 | 1/1978 | Fehlner et al. | 165/105 |

FOREIGN PATENT DOCUMENTS 485296  1/1976  U.S.S.R. .................................. 165/105

Primary Examiner—James C. Yeung
Attorney, Agent, or Firm—William H. Holt

[57] ABSTRACT

A system for utilizing and storing solar energy which includes the use of solar collectors attached to liquid tubes or unidirectional heat pipes for transferring solar flux into heat energy for instant uses and storing the heat energy into earth ground for auxiliary and long-term uses. An expanding array of heat conductive pipes distributes the heat throughout a large volume of underground earth and extracts the same when it is required. The system provides for long-duration earth storage of the heat energy which can later be used as independent source for both space heating and hot water heating in homes, multiple-unit housing, commercial and public buildings, swimming pools, greenhouses, industrial needs, etc.

A unidirectional heat pipe, characterized by irreversible heat flow, including a pump arrangement for transferring working fluid from the non-wicking condenser section to the evaporator section of the said heat pipe.

9 Claims, 4 Drawing Figures

4,184,477

SOLAR HEATING AND STORAGE

BACKGROUND OF THE INVENTION

The invention relates to a system for collecting, distributing, utilizing and storing solar energy, and more particularly, relates to a system which utilizes unidirectional heat pipes and the earth as means of transfer and storage, respectively, of solar energy.

Prior art solar heating systems are generally accomplished by placing large collector plates on the roof and side structures of buildings. Liquids, such as water, are piped through the collector, heated to a higher temperature, and subsequently circulated through a building and used as a space and tapwater heating medium. It a more elaborate application of the same principle, it has been suggested to place large tanks of water, rocks, stones, etc., in the ground and have heated water from the solar collector fed into the tanks where the heat energy is stored and utilized for space and hot water heating. The above mentioned systems would lose their effectiveness during prolonged cloudy or rainy weather because of its incapacity to store more than a few days' supply of heat energy. This is particularly true of those locations which have a large number of cloudy, rainy or snowy days during the year, especially during the winter months when the heat is most needed, but when the sunlight hours are shortest. Furthermore, a large solar collector area must be provided for constant supplies of energy for space and hot water heating during winter months.

The present invention overcomes these disadvantages of the prior art by providing more efficient means for transferring solar energy for utilization and for long duration earth storage.

SUMMARY OF THE INVENTION

The present invention relates to a novel system for utilizing and storing solar energy wherein the system comprises a collector means for collecting solar energy and changing the solar energy to heat energy, means for transmitting the heat energy from the collector means to liquid contained in a thermal liquid tank, and a distributing means for distributing the heated liquid to a heat exchanger for space and hot water heating medium and to a ground reservoir for long duration storage.

For accomplishing the foregoing objective, the invention contemplates the use of solar collectors, liquid tubes or inidirectional heat pipes for transferring the solar energy to the thermal liquid tank and the storage ground, and piping loops for both transferring and storing of heat in the system, and extraction of heat from the storage ground for space heat and hot water heating. The unidirectional heat pipe functions in the system as a sort of rectifier, for transferring solar flux to useful heat energy, and allowing the heat energy to flow with the least possible resistance from the evaporator section of the heat pipe to its condenser section in the thermal liquid tank during the period of time when the sun is shining, but prevents the reverse flow of heat energy when the temperature near the solar collector is lower than that of the thermal liquid tank.

Accordingly, an important object of the invention is to provide for a thermal liquid storage tank for heat energy which can be used for both space heating and hot water heating systems, and for long-duration earth storage.

Another important object of the invention is to provide for long-duration earth storage of solar energy which can be used at any desirable time for both space heating and hot water heating systems in multiple-unit housing, public buildings such as schools etc., commercial buildings or single dwellings, swimming pools, greenhouses, and industrial needs.

A further and important object of the invention is to provide an efficient means for transferring solar energy from solar flux collectors into the thermal liquid tank through the use of a novel unidirectional heat pipe including an evaporator section, an adiabatic section, a condenser section and a working fluid, wick means disposed only in the evaporator section, and pump for transferring the working fluid from the condenser section to the evaporator section.

A further object of the invention is to provide a thermal liquid tank and a heat storage reservoir in the earth ground for instant and auxiliary supplies of energy for year-round space heating and hot water heating without the aid of conventional heating systems.

A still further object of the invention is to provide for an efficient means of transferring solar energy into useful heat and a sufficiently large thermal earth storage reservoir in order to reduce considerably the amount of solar collectors.

A still further object is to provide an efficient means to collect and store an abundance of solar energy during the summer season for subsequent winter use when the efficiency of collecting solar energy is extremely low and the demand of energy is highest.

Further objects and advantages of my invention will become apparent from an understanding of the following detailed description of preferred embodiments of my invention.

DESCRIPTION OF THE DRAWINGS

Referring to FIG. 1 the novel collection, utilization and storage system, generally indicated by number 10, including a conventional solar collector 12 which may be planar, tubular, parabolic, or any other type of collector, for collecting solar energy and transferring the heat energy thereof to a heat absorbing tube 14 containing a liquid heat transfer medium. The heated liquid contained in the tube 14 is circulated by a pump 16 through conduit 18 and discharged to an insulated thermal tank or heater 20 through inlet 22 and returned to tube 14 through tank exit 24, conduit 26 and collector inlet 28. The process of collecting solar heat continues during the period of sunshine and operation of the pump 16 is controlled by a thermostat 17 which turns off pump 16 when the sun is not shining.

Figure 1:
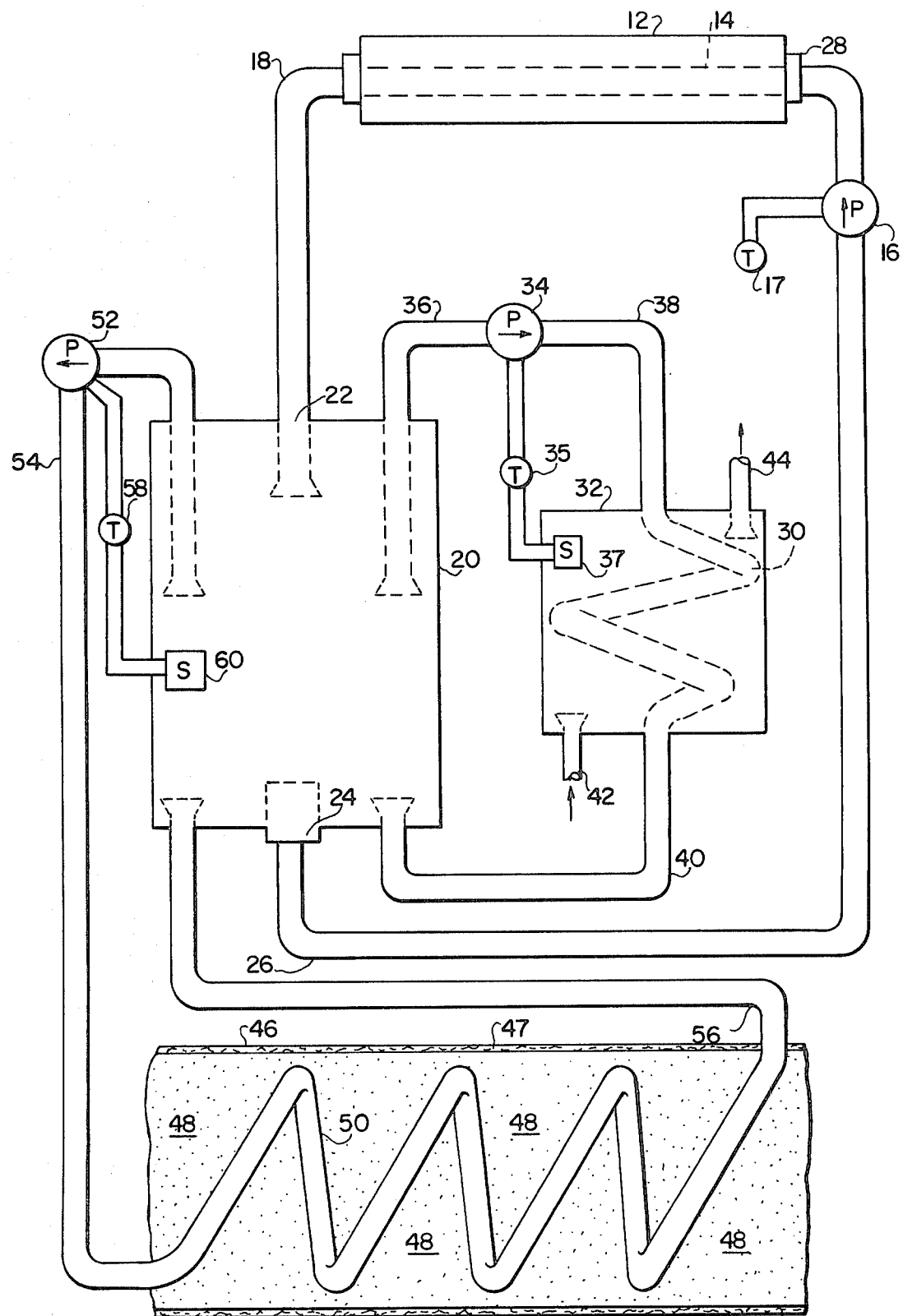
FIG. 1 is a diagrammatic sectional view of a system for collecting, utilizing and storing solar energy in accordance with the present invention.

The heat utilization system includes the thermal tank 20 connected to a heat exchanger 30 inside a hot water heat utilization tank 32. Heat energy is transmitted from the thermal tank 20 to water tank 32 through heat exchanger 30. Pump 34 is located between conduit 36 and conduit 38 which connect the thermal tank 20 and hot water tank 32.

During normal operation pump 34 is automatically controlled or arrested by a thermostatic control 35 responding to the water temperature measured by a sensor 37 in the hot water tank 32. When the water temperature in the tank 32 drops below the preset range of value, pump 34 starts automatically and hot water in the heater 20 will be circulated through the heat utilization system by passing through conduits 36 and 38 into the heat exchanger 30 in the hot water tank 32, and returning to the thermal tank 20 through conduit 40. The process of circulating hot water through the heat utilization system continues until the preset water temperature in the said water tank 32 is reached, and the pump 34 will be shut off automatically by thermostatic control 35.

As is obvious, when cold water flows into the water tank 32 through the inlet 42 it will absorb heat from the heat exchanger 30. The heated water in the water tank 32 may be directed through the outlet 44 to any suitable place for storage or use. For example, the heated water could be circulated through the heating system of a residence but certainly could be used for any other heating purpose and hot water needs.

The heat storage system 46 consists of a volume of sand or packed bed 48 and an expanding array of pipe 50. When the water temperature in the thermal tank 20 is raised to a desired temperature (during sunshine), the thermostatically controlled pump 52 will start to circulate the hot water (counterclockwise) through conduit 54 to the heat storage unit 46 through the expanding array of pipe 50 and passing through the conduit 56 back to the thermal tank 20. The process of circulating hot water through the heat storage system continues until a preset water temperature in the thermal tank 20 is reached, and the pump 52 will be shut off automatically by a thermostatic control 58 and sensor 60.

When it is desired to use some of the heat that has been stored in storage unit 46 (i.e., the water temperature in the thermal tank 20 drops below the preset range of value) the pump 52 will be started by thermostatic control 58, and the water is circulated from the thermal tank 20 through the array of pipe 50 in the heat storage unit and back to the tank 20 in a counterclockwise sense. It is, of course, to be understood that the water in the array of pipe 50 picks up the heat energy of the surrounding sand 48 as it passes through the heat storage unit 46. Again, the pump 52 is shut off by thermostatic control 58 when the hot water in the tank 20 reaches a preset temperature.

While the foregoing description of the invention has been limited to only a single array of pipe 50, it will be readily understood that multiple arrays of pipe 50 and additional heat absorbing tubes 14 may be added to the said solar heating system 10.

In order to increase efficiency of the heat storage system, a layer of insulating material 47 is disposed along both top and bottom surfaces of the heat storage system. It is to be understood that similar insulating material may be placed along sides of the heat storage system, if required.

Figure 4:
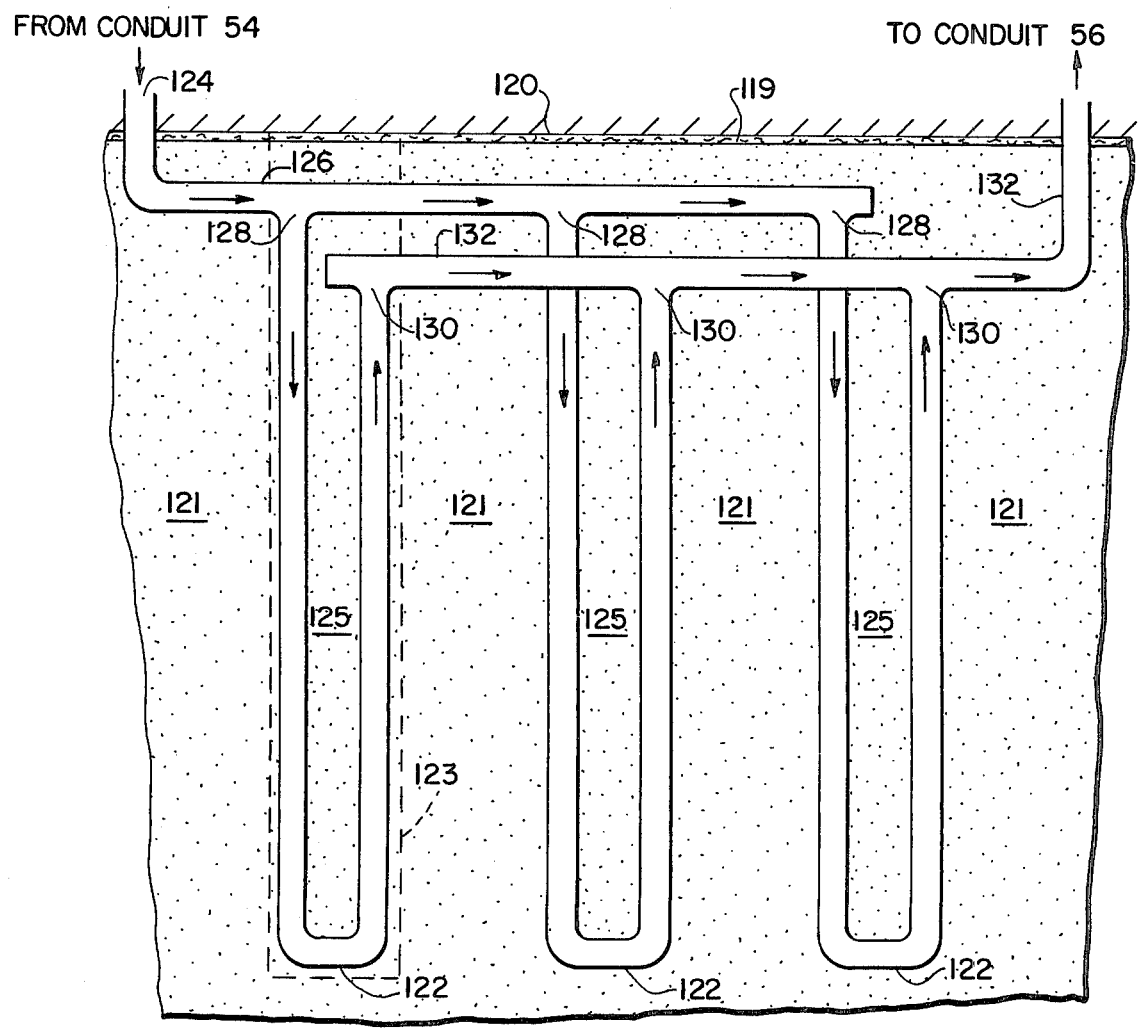
FIG. 4 is a diagrammatic section view of an alternative heat storage system in accordance with the present invention.

An alternative heat storage system 120 is shown in FIG. 4. The system consists of a volume of unprepared earth 121 with a series of drilled wells (one being indicated by broken lines 123) of predetermined depth. A series of long U-pipes 122 are buried in the wells and a portion of earth 125 is replaced. I define "U-pipe" as a fluid conveying pipe with entrance and exit ends formed like the upper part of a U shape. The remaining portion of said pipe may be of any desirable shape. The heat storage and the heat extraction methods of the system 120 are identical to that of the system 46 (see FIG. 1). As one example of apparatus for using the hot liquid in the thermal tank 20 (see FIG. 1) to store heat, the hot liquid from conduit 54 enters the storage system 120 at inlet 124 of the receiving pipe 126. The liquid flows into the U-pipes 122 at inlet 128 and leaves at exit 130 to the delivering pipe 132. The liquid then flows through pipe 132 back to the thermal tank 20 (see FIG. 1) through conduit 56 (see FIG. 1). The process of circulating hot liquid through the heat storage system 120 continues until a preset liquid temperature in the thermal tank 20 (see FIG. 1) is reached, and the pump 52 (see FIG. 1) will be shut off automatically by thermostatic control 58 (see FIG. 1). A similar manner of circulating the liquid through the heat storage system 120 can be applied for the case of heat extraction.

While the foregoing description of the invention has been limited to only a single series of U-pipes 122, it will be readily understood that multiple series of U-pipes may be added to the heat storage system.

In order to increase the efficiency of the heat storage system, a layer of insulating material 119 is disposed about on the surface of the earth, and preferably, the insulating material 119 is black plastic sheets, or the like, to serve as a vapor barrier and also to aid in collecting additional heat from the solar flux and transmitting such heat into said heat storage system. It is to be understood that similar insulating material may be placed along sides of said heat storage system, if required.

Figure 2:
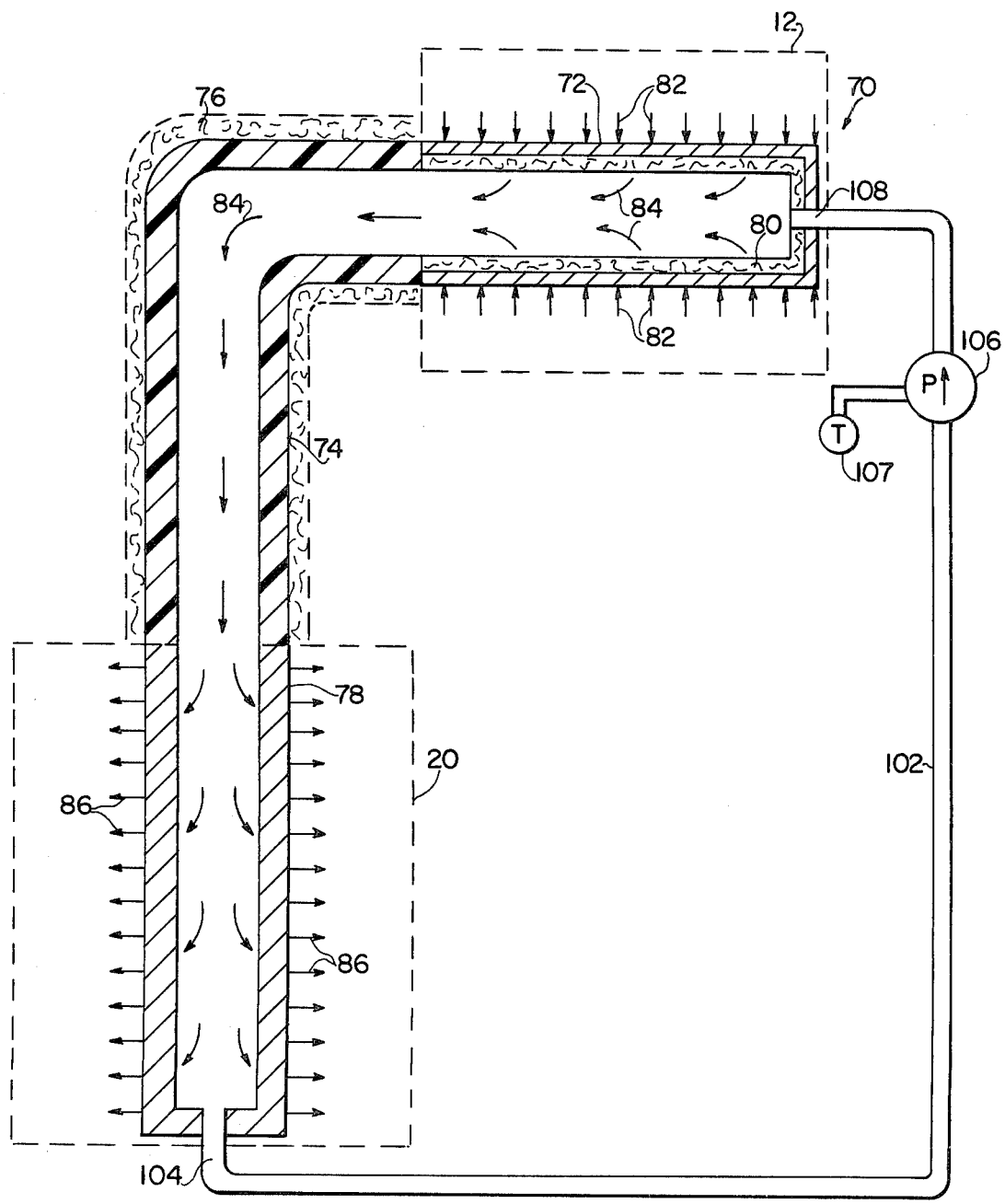
FIG. 2 is a diagrammatic vertical section of a unidirectional heat pipe constructed in accordance with the present invention.

FIG. 2 illustrates the constructional details of a preferred unidirectional heat pipe, generally indicted by the numeral 70, which is utilized as an alternative collection system of solar energy. The unidirectional heat pipe 70 includes an evaporator section 72, an adiabatic section 74 covered with a layer of insulating material 76, and a condenser section 78 as well as containing a working fluid (not illustrated). The evaporator section 72 is lined with a wick 80 and the adiabatic section 74 and the condenser section 78 are not lined with a wick. The wick 80 may be metal, such as wire screen, sintered metal powder or fiber, or perforated sheets, or it may be a non-metallic material such as felt, cloth, or fiber glass. The working fluid may be water, ammonia, acetone, fluorocarbons (refrigerants), alcohols, and various liquid metals. However, only enough working fluid to saturate the wick is introduced into the unidirectional heat pipe 70. The choice of container, wick material, and working fluid combination is based on the operations and design criteria of the heat pipe application.

In evaporator section 72 heat energy, indicated by the arrows 82, is received from the solar collector 12 and is transferred by conduction through the outer wall of the evaporator section 72. The heat energy 82 causes the working fluid to vaporize, as indicated by the arrows 84. The vaporized working fluid then flows downwardly through the adiabatic section 74 to the condenser section 78 where the vapor condenses and the heat energy is transmitted outwardly through the wall of the condenser section 78, all as is indicated by the arrows 86. It is to be understood this heat, as indicated by the arrows 86, is the heat given up in the thermal tank 20 of FIG. 3. In order to increase the heat transfer rate from the solar collector to the thermal tank liquid, metal fins 110 (see FIG. 3) may be mounted along the condensation section 78 of the unidirectional heat pipe 70 for more effectively removing heat therefrom.

In order that unidirectional heat pipe 70 operates in a continuous manner, it is necessary that the working fluid condensate in the condenser section 78 be returned to the evaporator section 72. This return of working fluid is provided by the provision of a return line 102 which is connected to a port 104, at the bottom of the condenser section 78, and connected to a pump 106 which is, in turn, connected to a port 108 at the evaporator section 72. It is to be understood that the pump 106 is preferrably operated only one-way in the direction to return working fluid from the condenser section 78 to the evaporator section 72. This is an important part of the energy collecting system (see FIG. 3) so that, when the collector 12 is not effectively operating and the ambient temperature around the evaporator section 72 is lower than the hot liquid temperature in the thermal tank 20 around the condenser section 78, the unidirectional heat pipe 70 is irreversible; in other words, heat energy is not transmitted upwardly through the adiabatic section 74 and lost to the atmosphere through the evaporator section 72.

When the solar energy is not available, or during extremely cold weather, the pump 106 will be shut off automatically by a thermostatic control 107. This prevents the reverse vapor flow in order to avoid heat losses from the thermal tank 20 to the surrounding environment. As an additional measure to prevent heat loss by axial conduction of heat upwardly through the unidirectional heat pipe 70, the adiabatic section 74 is made of a poor heat conductive material. Thus, the condenser section 78 is insulated from the evaporator section 72.

Figure 3:
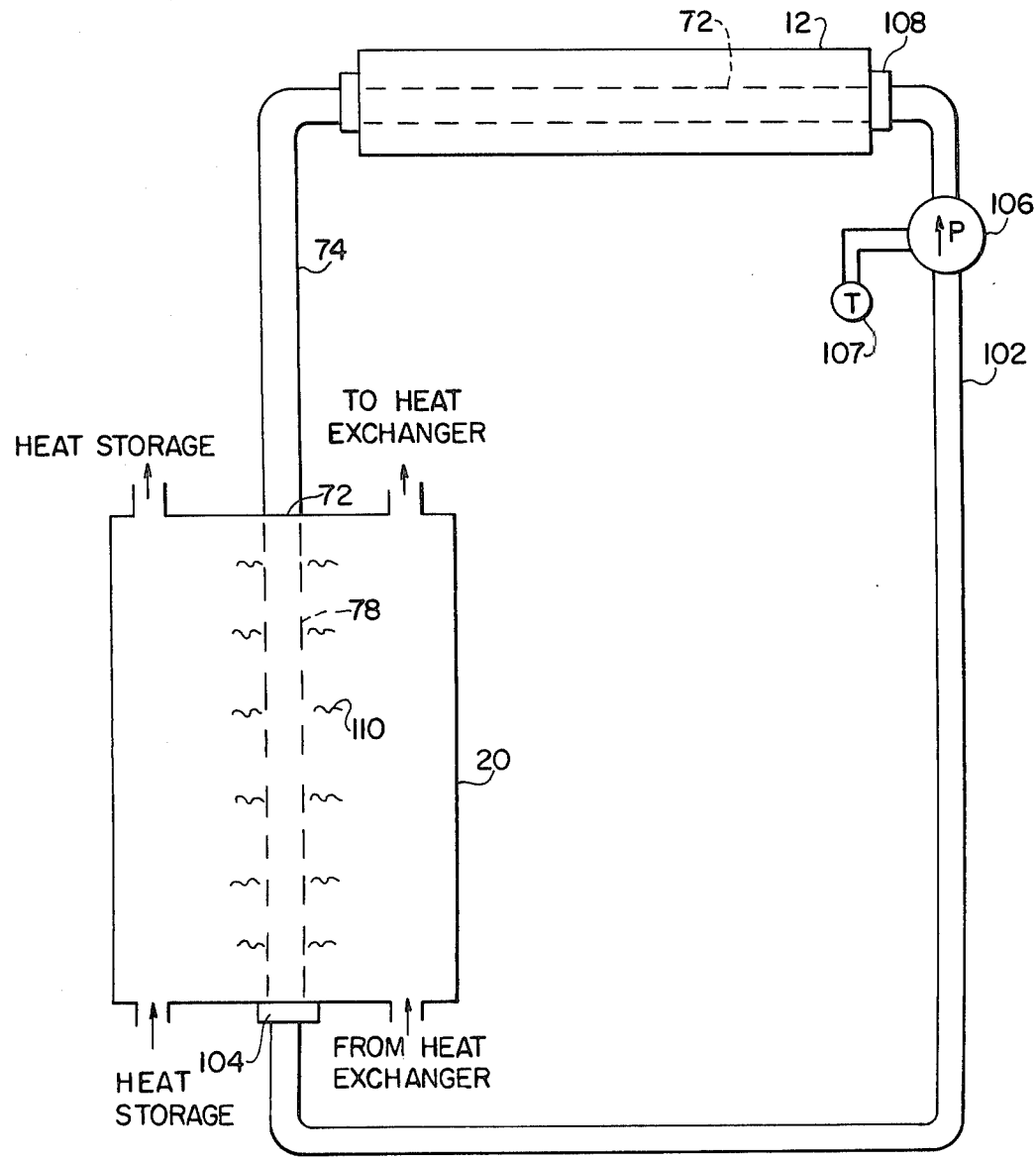
FIG. 3 is a diagrammatic section view of a system for collecting solar energy by employing a unidirectional heat pipe in accordance with the present invention.

The foregoing description teaches that a unidirectional heat pipe can be employed to transfer solar energy from the collector 12 to the thermal liquid tank as depicted in FIG. 3. The heat utilization system and the heat storage system can be identical to those shown in FIG. 1, or the heat storage system shown in FIG. 4.

While preferred storage and utilization systems and a preferred unidirectional heat pipe for use in such systems have been illustrated and described, it is to be understood that various changes and arrangement of parts may be made without departing from the spirit and scope of the invention as defined in the appended claim subject matter.

I claim:

1. A system for collecting, storing and utilizing solar energy, said system including a thermal tank containing a liquid and being substantially filled thereby, solar collector means for transmitting heat energy to said thermal tank, heat storage means, means for transmitting heat energy to and from said thermal tank and said heat storage means, a heat utilization tank, and means for recirculating heat energy between said thermal tank and said heat utilization tank, said solar collector means including a unidirectional heat pipe including an upper evaporator section, an adiabatic section and a lower condenser section, said evaporator section being exposed to solar heat energy and said condenser section being immersed in said thermal tank, said unidirectional heat pipe further including wick means disposed in said evaporator section and a working fluid contained within said heat pipe, characterized by an absence of any wick means in said adiabatic and condenser sections, conduit means extending externally of said heat pipe and connecting said condenser section to said evaporator section, and pump means in said conduit means for pumping condensed fluid from said condenser section and into said evaporator section.

2. A system as defined in claim 1 wherein said heat storage means comprises a considerable volume of soil-like material, and heat distributing means for distributing said heat energy throughout said volume of soil-like material positioned below ground level.

3. A system as defined in claim 2 wherein said heat distributing means comprises an array of pipes formed of heat conductive material, said array of pipes extending throughout said heat storage means, and means for causing a heat transfer fluid to flow within said pipes.

4. A system as defined in claim 1 wherein said heat storage means includes heat extraction means for extracting heat from said heat storage means and delivering heat to a desired location.

5. A system as defined in claim 1 wherein said heat storage means includes heat insulating means located along at least one side of the heat storage means for minimizing heat losses to adjacent surfaces.

6. A system as defined in claim 1 wherein said heat storage means comprises at least a volume of soil-like material positioned below ground level, and a plurality of horizontally spaced substantially vertically extending distributing means, that can be positioned in holes drilled in said soil-like material for distributing said heat energy to said heat storage means.

7. A system as defined in claim 6 wherein said heat distributing means comprises a long U-pipe of heat conductive material buried in said soil-like material, and means for causing a heat transfer fluid to flow within said pipe.

8. A system as defined in claim 6 including heat extraction means for extracting heat from said heat storage means and delivering said heat to a desired location.

9. A system as defined in claim 6 including heat insulating means located along at least one side of the heat storage for minimizing heat losses to adjacent surfaces.

* * * * *